(12) United States Patent
Martinez

(10) Patent No.: US 7,843,597 B2
(45) Date of Patent: Nov. 30, 2010

(54) SEPARATOR PAGE PROCESSING SYSTEM

(75) Inventor: Anthony Edward Martinez, St. Augustine, FL (US)

(73) Assignee: InfoPrint Solutions Company, LLC, Boulder, CO (US)

(*) Notice: Subject to any disclaimer, the term of this patent is extended or adjusted under 35 U.S.C. 154(b) by 1296 days.

(21) Appl. No.: 10/782,444

(22) Filed: Feb. 19, 2004

(65) Prior Publication Data
US 2005/0185220 A1      Aug. 25, 2005

(51) Int. Cl.
*G06F 15/00* (2006.01)
(52) U.S. Cl. .................. 358/1.2; 358/1.9; 358/450; 399/401; 380/54
(58) Field of Classification Search ............. 358/1.2, 358/1.15, 1.16, 1.18, 1.13, 1.19, 1.9, 1.14, 358/400, 462, 463, 1.17, 448, 450, 474; 700/213; 399/41, 411, 401, 32, 1, 75; 283/99, 94, 283/93; 400/76, 61, 70; 271/10.04; 380/54, 380/55
See application file for complete search history.

(56) References Cited

U.S. PATENT DOCUMENTS

| | | | |
|---|---|---|---|
| 5,316,279 A | 5/1994 | Corona et al. | 270/1.1 |
| 5,547,178 A | 8/1996 | Costello | 270/52.02 |
| 5,721,813 A * | 2/1998 | Leinhos | 358/1.18 |
| 6,236,831 B1 * | 5/2001 | Mei et al. | 399/411 |
| 6,415,117 B1 | 7/2002 | Bates et al. | 399/84 |
| 6,538,770 B1 | 3/2003 | Mestha | 358/1.9 |
| 6,619,695 B2 * | 9/2003 | Douglin et al. | 283/94 |
| 6,650,428 B1 * | 11/2003 | Hernandez | 358/1.13 |
| 6,771,383 B1 * | 8/2004 | Ogaki et al. | 358/1.15 |
| 7,066,460 B2 * | 6/2006 | Asao | 271/10.04 |
| 2004/0080787 A1 * | 4/2004 | Kakikawa et al. | 358/1.18 |
| 2005/0060059 A1 * | 3/2005 | Klein et al. | 700/213 |

* cited by examiner

*Primary Examiner*—Edward L Coles
*Assistant Examiner*—Ashish K Thomas
(74) *Attorney, Agent, or Firm*—Blakely, Sokoloff, Taylor & Zafman LLP

(57) ABSTRACT

A method and implementing computer system are provided for enabling multiple usages of the same printing job separator page. Separator pages are scanned and an image of the separator page content is obtained in order to determine the location on the separator page of prior print job identification information blocks. The prior identification information block is then obscured and identification information for a newly queued print job is printed in a new information block which is positioned in an unused area of the separator page. The separator pages may be reused until the full extent of each separator page has been filled-up with used or obscured print job identification blocks.

18 Claims, 6 Drawing Sheets

SEPARATOR PAGE PROCESSING SYSTEM

FIELD OF THE INVENTION

The present invention relates generally to information processing systems and more particularly to a methodology and implementation for enabling multiple usages of print job separator pages.

BACKGROUND OF THE INVENTION

Computing centers that employ one or more printers to serve a group of users, such as a networked group or other work group, rely on the printers to batch process print jobs, i.e. print-out a series of different print jobs in succession. Such printers produce separator pages which are used to identify each of the different print jobs and separate one from the next. The separator pages usually include one or two lines of text which identify the requesting party and identify the job number. Except for those few lines used to identify the print job, the remainder of the separator page is blank. Once a print job is picked-up by the requesting party, the separator page is no longer needed since it has served its purpose, and is therefore discarded. This practice results in thousands of dollars wasted every year by businesses using printers.

Thus, there is a need for an improved methodology and system for enabling multiple usages of separator pages in batch printing operations.

SUMMARY OF THE INVENTION

A method and implementing computer system are provided for enabling multiple usages of the same printing job separator page. Separator pages are scanned and an image of the separator page content is obtained in order to determine the location on the separator page of prior print job identification information blocks. The prior identification information block is then obscured and identification information for a newly queued print job is printed in a new information block which is positioned in an unused area of the separator page. The separator pages may be reused until the full extent of each separator page has been filled-up with used or obscured print job identification blocks.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
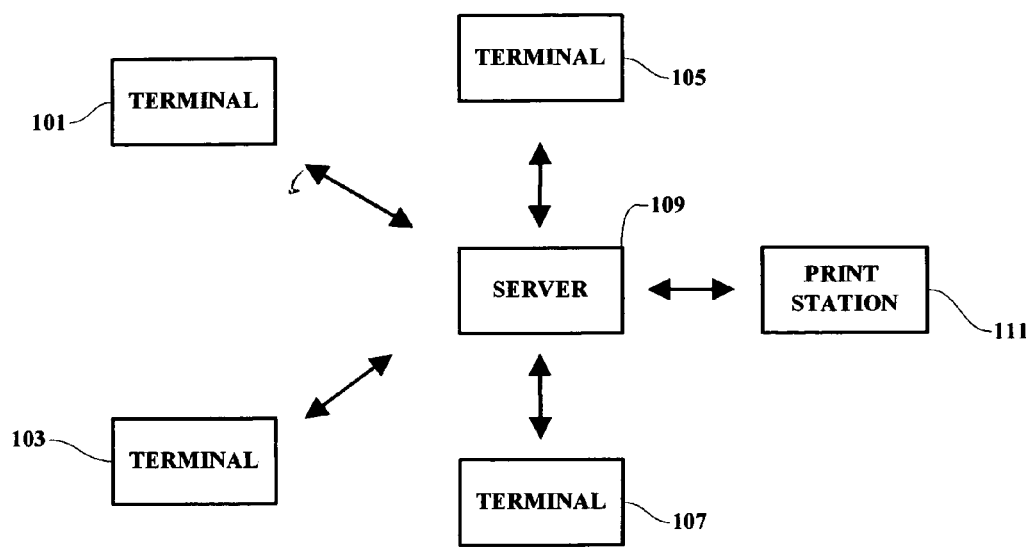
FIG. 1 is a computer system which may be used in an exemplary implementation of the present invention.

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

The various methods discussed herein may be implemented in any printing system which is arranged to receive and print-out requested print jobs from one or more user terminals. Such printing systems may be implemented within a stand-alone computer system or over a computer network. A networked system may include a server and one or more computer terminals. The computer terminals may comprise either a workstation, personal computer (PC), laptop computer or a wireless computer system or other device which has word processing capabilities, including but not limited to cellular or wireless telephone devices and personal digital assistants (PDAs). In general, an implementing computer system may include any computer system and may be implemented with one or several processors in a wireless system or a hard-wired multi-bus system, or within a network of similar systems.

In the FIG. 1 example, an exemplary computer system includes a group of terminals 101, 103, 105 and 107 which are arranged to communicate with a system server 109 which, in turn, is connected to a system printer or print station 111. Print jobs are requested by the terminals 101-107, sent to the server 109 and queued-up to be printed by the system printer 111.

Figure 2:
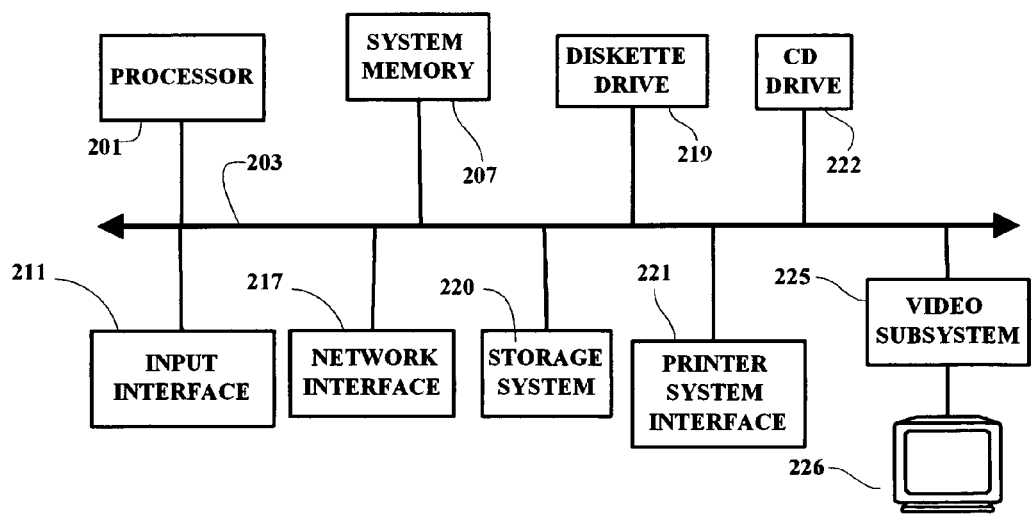
FIG. 2 is a schematic block diagram illustrating several of the major components of an exemplary server which may be implemented in the computer system illustrated in FIG. 1.

Several of the major components of an exemplary server 109 are shown in FIG. 2. As shown in the example, processor circuit 201 is connected to a system bus 203 which may be any host system bus. It is noted that the processing methodology disclosed herein will apply to many different bus and/or network configurations. A system memory device 207 is also connected to the bus 203. A network interface 217 is provided to enable connection to external devices and/or remote networks. The system bus 203 is also connected to an input interface circuit 211 for receiving input to the server. A diskette drive unit 219 and a CD drive unit 222 are also shown as being coupled to the bus 203. A video subsystem 225, which may include a graphics subsystem, is connected to a display device 226. A storage system 220, which may comprise a hard drive array and/or flash memory, is also coupled to the bus 203. The diskette drive unit 219 as well as the CD drive 222 provide a means by which individual diskette or CD programs may be loaded into system memory 207 or on to the storage system 220, for selective execution by the server 109.

The printer device or print station 111 may contain its own computing circuitry including, inter alia, having its own processor, input/output and memory components. As is well known, program diskettes and CDs containing application programs represented by magnetic indicia on the diskette or optically readable indicia on a CD, may be read from the diskette or CD drive into a server or printer memory, and the computer system is selectively operable to read such magnetic or optically readable indicia and create program signals.

Such program signals are selectively effective to cause the computer system, including the printer 111, to perform in accordance with such program signals. Thus, the flow illustrated in FIG. 9 may be implemented in hardware or software to provide program signals to effect the flow sequence shown.

Figure 3:
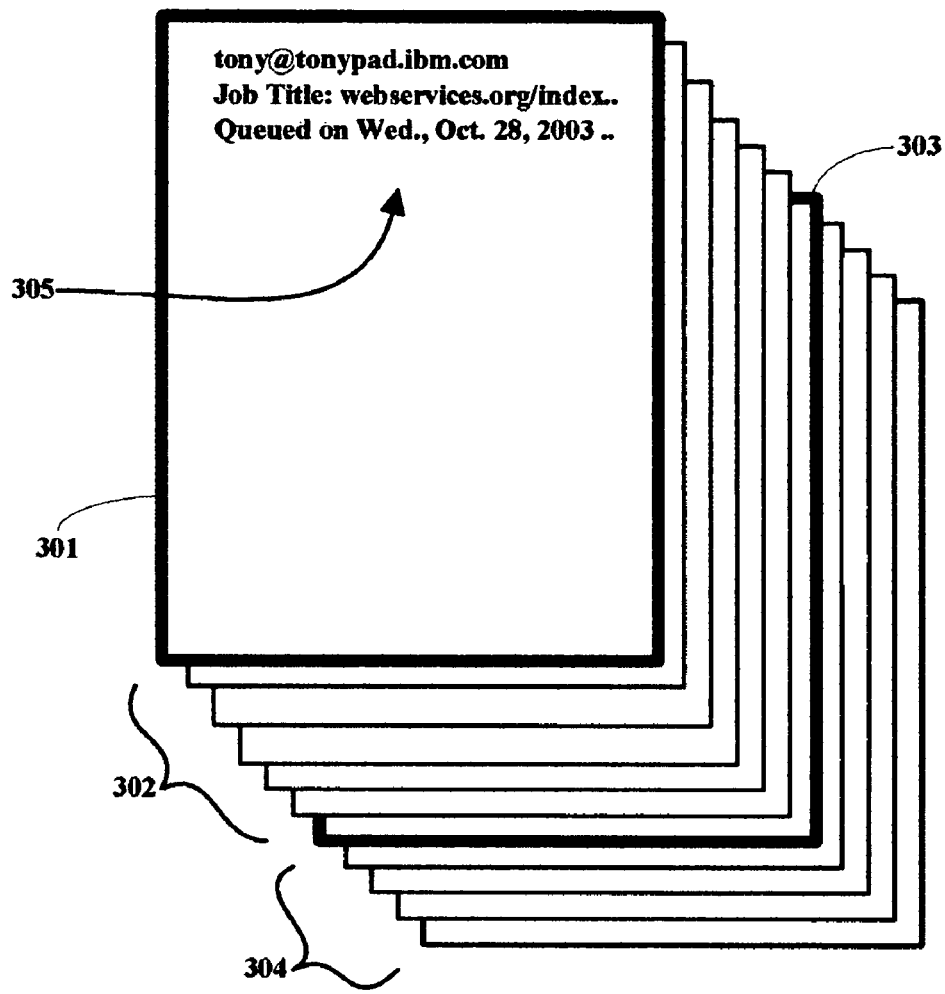
FIG. 3 is an illustration of a stack of print jobs with print job separator pages.

The print jobs requested by the terminals 101-107 are completed and output by the printer 111. As shown in FIG. 3, each print job 302, 304 is separated from the next print job by a separator page 301, 303. Each separator page includes print-job related information 305 to identify the associated individual print jobs.

Figure 4:
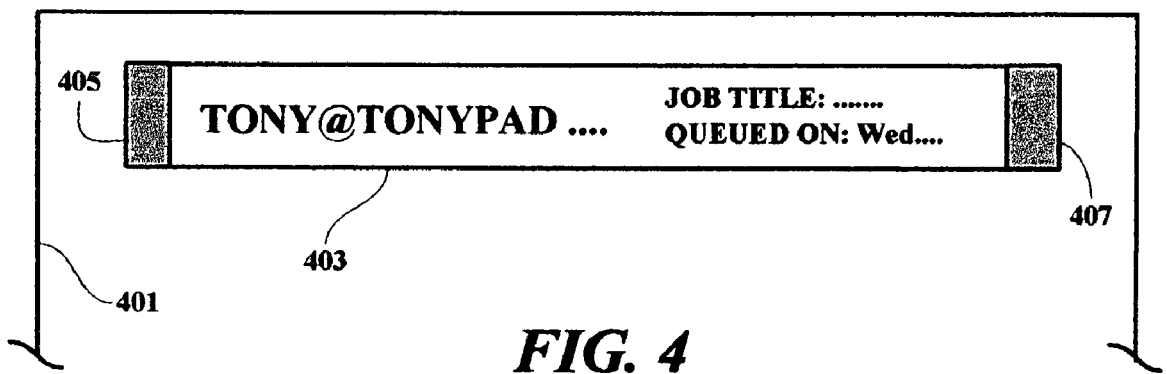
FIG. 4 is a more detailed view of an exemplary information block in which print job identification information is printed.
Figure 5:
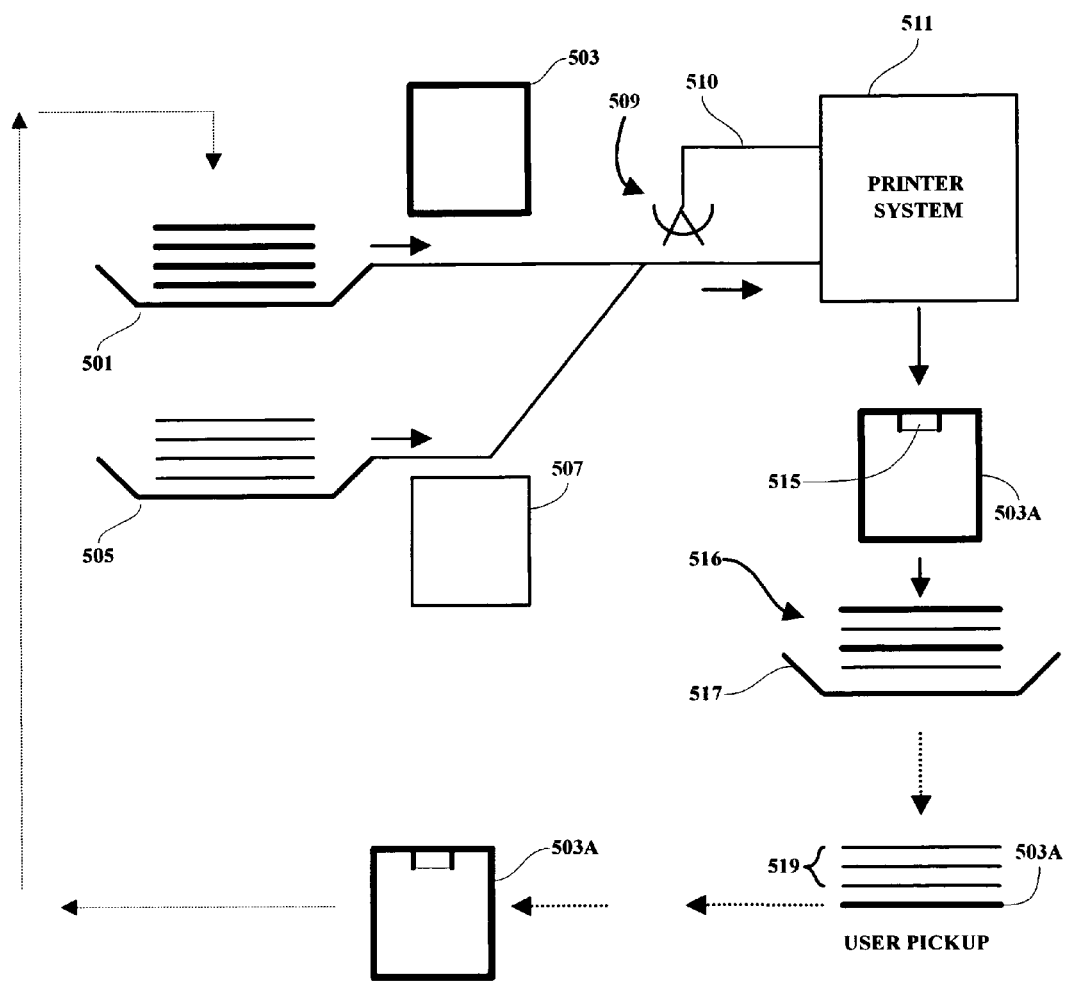
FIG. 5 is a schematic diagram illustrating an exemplary operation of the present invention.

As shown in FIG. 4, in accordance with the present invention, the print job identification information of a current print job is printed on a separator page 401 within a print job identification block 403, which includes end markers 405 and 407. The end markers 405 and 407 are shown in gray and are used to define the machine readable identification block 403 and distinguish that block, which may be easily detected and read by a scanning device, from the text of the identification information itself. The scanning device may be built into or otherwise coupled to the printer, as is illustrated in FIG. 5. In accordance with the present invention, the detection of the end markers 405 and 407 will define the location on the separator page of an un-obscured identification block, i.e. a print job identification block that contains readable print job information. For a re-used separator page, the location of a previous identification block must be determined so that it can be obscured by the printing system prior to the printing of a new identification block for a currently queued printing job. Once a previous identification block has been obscured, the end markers 405 and 407 will not longer be identifiable as end points for an identification block. Thus, the detection of end markers 405 and 407 means there is an identification block printed on a separator page and, if no end markers are detected, it means that there is no readable identification information on a separator page and that a new identification block may be printed in an unused space of the page.

As shown in the schematic diagram of FIG. 5, a print job separator page tray 501 contains a supply of separator pages which will be used to separate print jobs output from a printer system 511. A supply of printing paper is also contained within a print page tray 503. The printing paper 507 is used to print the requested print jobs while the separator pages 503 are used to separate the print jobs from each other. A scanner 509 is coupled 510 to the printer system 511. The scanner 509 in a preferred embodiment will be built into the printer system 511 although the scanner may also comprise a stand-alone device which is electrically coupled to the printer system 511. The scanner 509 examines separator pages 503 as they are mechanically conveyed out of the supply tray 501 before they are printed with the current print job summary information, e.g. 403. The scanning process looks for any existing job summaries within machine readable regions as defined by the end markers 405 and 407 in order to determine where the summary for the next print job is to be printed. As shown in FIG. 5, the first separator sheet 503 is clear of job summaries and contains no end markers. This is detected by the scanner and sent to the printing system 511 which will then print a print job summary of the current print job in a new print identification block 515 at the top of the new separator page as shown on sheet 503A. Sequential print jobs 516 are stacked along with their separator sheets in output tray 517.

When a user picks-up his or her print job 519 from the output tray 517, the corresponding separator page 503A is routed back to the separator page input tray 501. This routing of the old separator page may be accomplished automatically when a user picks-up the user's print job and leaves the separator page 503A in the bottom of an output or holding tray (not shown).

Figure 6:
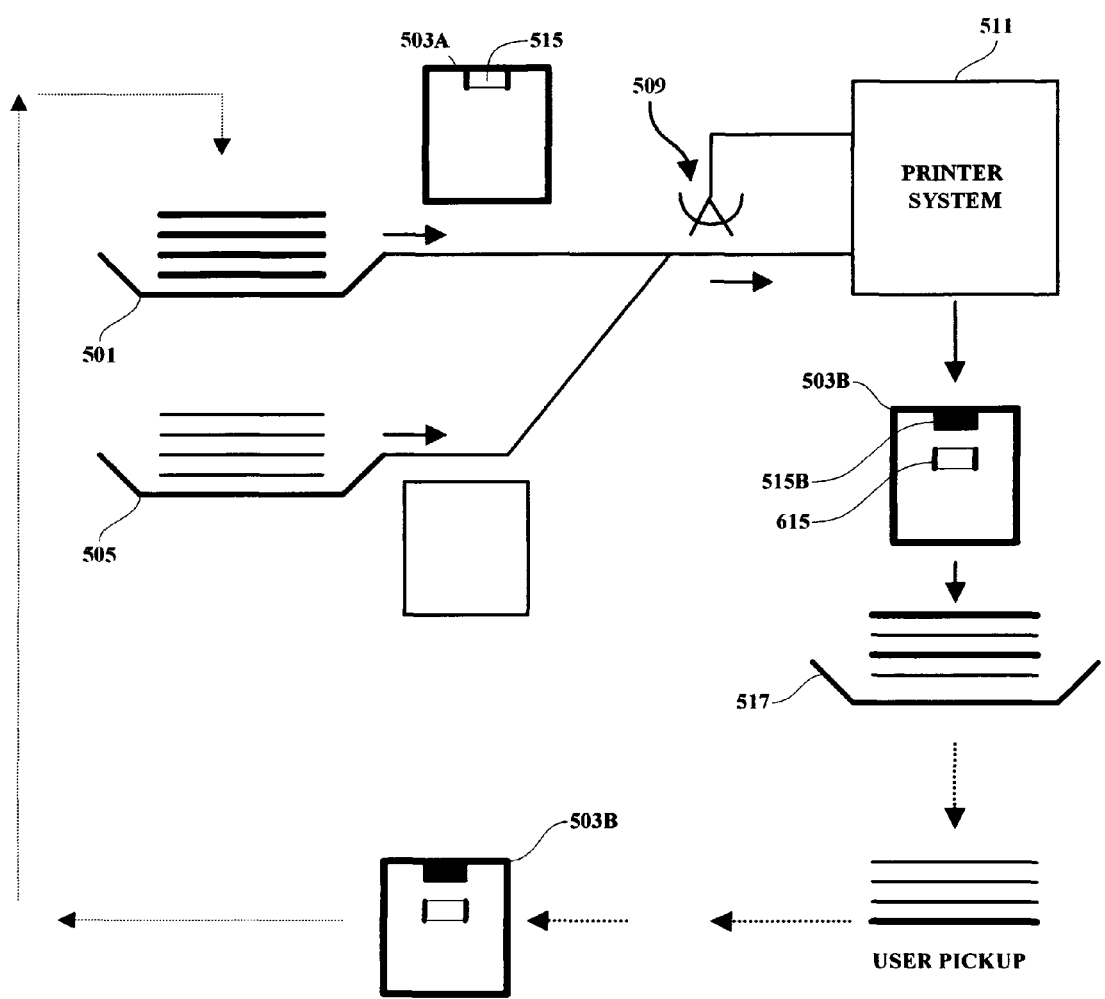
FIG. 6 is a schematic diagram illustrating another exemplary operation of the present invention.

As shown in FIG. 6, when the once-used separator page 503A is next used, the scanner 509 will detect the old print job identification (ID) block 515 and communicate that information to the printer 511. The printer then overstrikes or otherwise obscures the old print job ID block 515 as shown in FIG. 6, and effect the printing of a current print job ID block 615 in an available machine readable region on the separator sheet as shown on page 503B. Because each separator page is individually scanned to locate the coordinates of old or previously used ID blocks, the dimensions of old ID blocks on separator pages may be of variable length and the strike-out function will still be able to perform properly to fully strike-out or obscure prior print job ID information on a scanned separator page. This enables maximum use of separator page space for ID information as well as providing greater flexibility with regard to separator page ID block designs. If available, the new print job ID block 615 will be printed directly below the obscured or blackened-out area 515B of the old print job ID block 515. The twice-used separator sheet 503B is then returned to the separator page tray 501 to be re-used for another print job. When the scanner detects that all of the machine-readable regions of a separator page have been obscured or blackened-out as shown in the example, the scanner will generate an appropriate control signal for the printer to discard the fully used separator page and the next separator page will be scanned for available space for printing the next print job ID information block.

The obscuring or over-striking of the old print job ID information may be accomplished in any of many possible ways. In the example, the old print job information is totally obscured by overprinting solid black bars such that the old print job information as well as the ID block end markers are not readable. The old print job information may also be also be obscured by merely hashing-out the old print job information using closely spaced slanted lines for example, if the identification of prior print jobs need not be maintained in confidence. The exact type of obscuration may be selected by the party requesting the print job so that non-confidential print jobs may be obscured by hash marks (to save ink) and print jobs that may contain confidential information in the print job ID sheet would be totally blackened-out or otherwise totally obscured. The scanner is also able to detect when a used separator page is upside-down and the old printer job information block is at the bottom of the separator page. In that case, the old printer job information is obscured or blackened out but the new printer job ID block is printed in the first available machine readable space from the top of the separator page.

Figure 7:
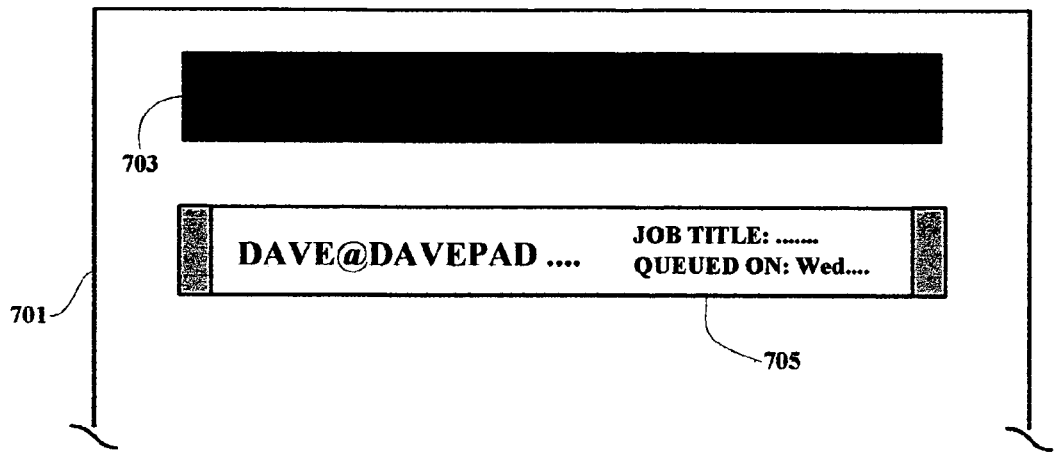
FIG. 7 is an illustration showing an exemplary obscuration of a print job identification block and a printing of an identification block for a newly queued print job.
Figure 8:
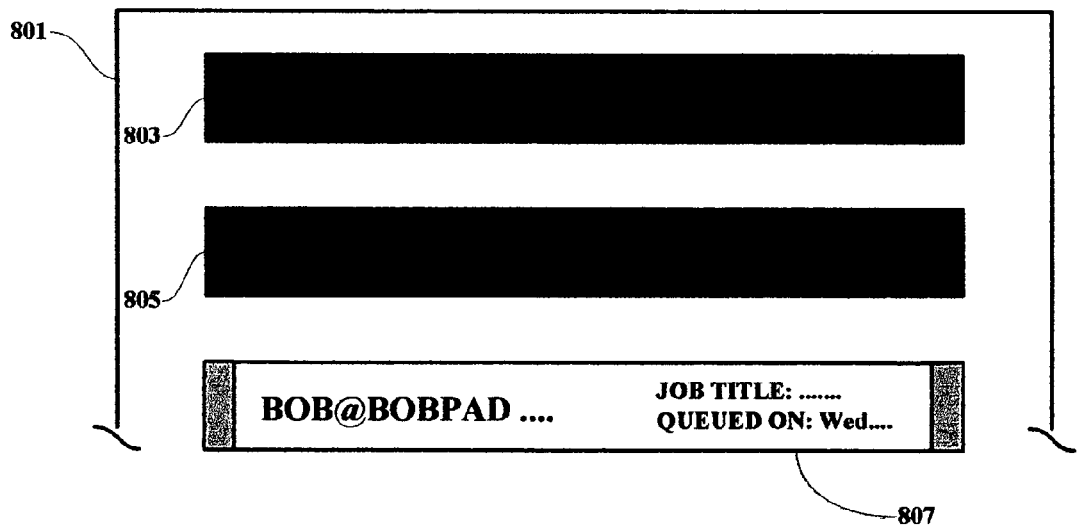
FIG. 8 is an illustration showing an exemplary obscuration of a print job identification block subsequent to that shown in FIG. 7 and a printing of an identification block for a newly queued print job.

FIG. 7 shows an exemplary once-used separator page 701 including a totally blackened-out printer job ID section 703 and a newly printed job ID 705 directly below the previously used ID block 703. FIG. 8 shows a separator page 801 which includes two previously used ID blocks 803 and 805 which have been obscured, and also a current print job ID block 807.

Figure 9:
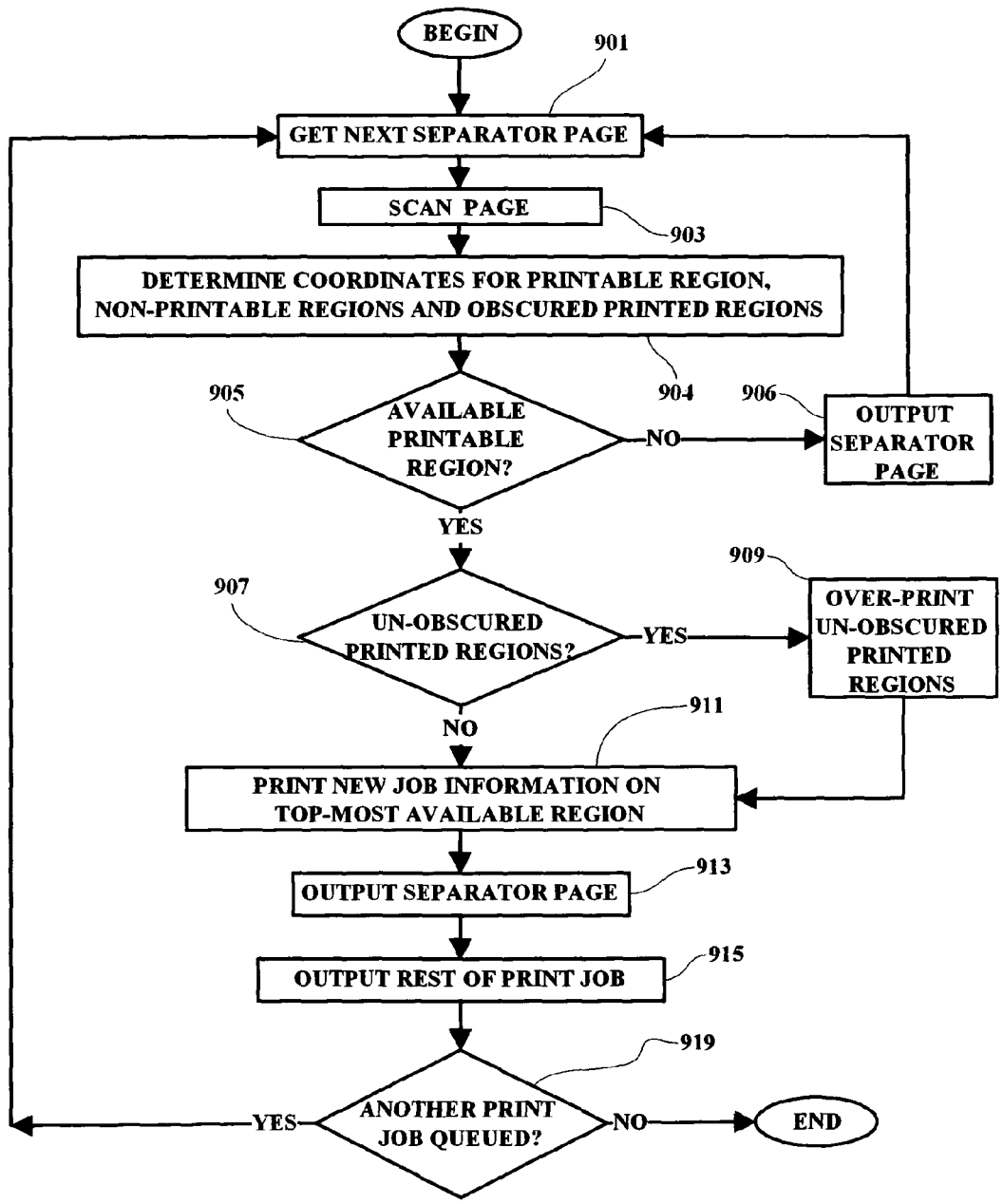
FIG. 9 is a flow chart illustrating a high level operational flow in an exemplary implementation of the present invention.

As shown in the exemplary flow chart illustrated in FIG. 9, as a new print job begins, a new separator page is routed 901 from the separator page tray 501 and an image of the separator page is acquired 903. This image may be acquired in any of many known image acquiring techniques including optical line or full page scanning as well as digital photography techniques. The information obtained from the scanning process will identify and enable a determination 904 of where print job ID block end markers, if any, are located on the separator page as well as where fully blackened-out blocks are located and also the regions of the separator page which are clear and available for printing new information. If the page scan results in a determination that the separator page information regions have all been blackened-out or obscured and that there are no remaining printing regions available on the separator page 905, then that separator page is output and discarded 906 and the next separator page is acquired 901. If, however, the page scan results in a determination that there are available print regions on the separator page 905, then a check is made to determine if there are any un-obscured print regions 907. This is accomplished by the detection of end markers as discussed earlier. If there are no un-obscured print regions detected 907, then the new or current print job information block is printed on the top-most available region of the separator page. If there is an un-obscured print region located 907, i.e. an old print job information block which has not been obscured, then the old print job information block is over-printed 909 before the new print job information block is printed 911. Next, the separator page containing the new or current print job information is output 913 together with the remainder of the print job 915. The process will then repeat for the next print job until there are no more queued print jobs 919 at which time the process will end.

The method and apparatus of the present invention has been described in connection with a preferred embodiment as disclosed herein. The disclosed methodology may be implemented in a wide range of sequences to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A computer implemented method for processing a separator page used for separating print jobs being output from a printer system, said method comprising:
   receiving an input separator page for use in identifying a second print job;
   determining if said input separator page contains first print job information indicating use of the input separator page as a first print job page by optically identifying a first set of end markers on the input separator page;
   obscuring said first print job information and the first set of end markers said first print job information is determined to be present on said input separator page;
   optically examining the input separator page to determine if all machine readable regions on the input separator page have been obscured by;
   discarding the input separator page if all machine readable regions on the input separator page have been obscured; and
   printing second print job information on a machine-readable region of said input separator page between a second set of end markers thereby providing a second print job separator page if all machine readable regions on the input separator page have not been obscured.

2. The method as set forth in claim 1 wherein said determining includes obtaining a bit map image of said input separator page.

3. The method as set forth in claim 1 wherein said determining is accomplished by scanning said input separator page using an optical scanning device.

4. The method as set forth in claim 1 wherein said determining is accomplished by obtaining a photo image of said input separator page.

5. The method as set forth in claim 1 and further including:
   printing said second print job;
   assembling said second print job with said second print job separator page; and
   outputting said second print job with said second print job separator page from said printer.

6. The method as set forth in claim 1 and further including:
inputting said second print job separator page containing said second print job information for receiving by said printer system for processing a third input separator page to be used to identify a third print job.

7. A storage medium including non-transitory signal machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being selectively operable for enabling processing of separator pages used for separating print jobs being output from a printer system by effecting the steps of:
   receiving an input separator page for use in identifying a second print job;
   determining if said input separator page contains first print job information indicating use of the input separator page as a first print job page by optically identifying a first set of end markers on the input separator page;
   obscuring said first print job information and the first set of end markers said first print job information is determined to be present on said input separator page;
   optically examining the input separator page to determine if all machine readable regions on the input separator page have been obscured;
   discarding the input separator page if all machine readable regions on the input separator page have been obscured; and
   printing second print job information on a machine-readable region of said input separator page between a second set of end markers thereby providing a second print job separator page if all machine readable regions on the input separator page have not been obscured.

8. The medium as set forth in claim 7 wherein said determining includes obtaining a bit map image of said input separator page.

9. The medium as set forth in claim 7 wherein said determining is accomplished by scanning said input separator page using an optical scanning device.

10. The medium as set forth in claim 7 wherein said determining is accomplished by obtaining a photo image of said input separator page.

11. The medium as set forth in claim 7 and further including:
    printing said second print job;
    assembling said second print job with said second print job separator page; and
    outputting said second print job with said second print job separator page from said printer.

12. The medium as set forth in claim 7 and further including: inputting said second print job separator page for receiving by said printer system for processing a third input separator page to be used to identify a third print job.

13. A printing system for processing separator pages used for separating print jobs being output from said printing system, said printing system comprising:
- a printer device;
- an input device for providing an input separator page to said printer for identifying a second print job;
- an image acquisition device arranged between said input device and said printer device, said image acquisition device being operable for optically obtaining image information identifying information contained on said input separator page; and
- processing means coupled to said image acquisition device for determining if said input separator page contains first print job information indicating use of the input separator page as a first print job page by optically identifying a first set of end markers on the input separator page, said printer device being operable for obscuring said first print job information and the first set of end markers if said first print job information is determined to be present on said input separator page and optically examining the input separator page to determine if all machine readable regions on the input separator page have been obscured, said printer device being operable for discarding the input separator page if all machine readable regions on the input separator page have been obscured and printing second print job information on said input separator page between a second set of end markers at a predetermined position relative to said obscured first print job information thereby providing a second print job separator page if all machine readable regions on the input separator page have not been obscured.

14. The printing system as set forth in claim 13 wherein said image acquisition device is operable for obtaining a bit map image of said input separator page.

15. The printing system as set forth in claim 13 wherein said image acquisition device is an optical scanner.

16. The printing system as set forth in claim 13 wherein said image acquisition device is a digital camera.

17. The printing system as set forth in claim 13 wherein said processing means is operable for comparing said image information contained on said input separator page with reference image information stored in memory.

18. The printing system as set forth in claim 13 wherein said input device is operable for inputting said second print job separator page containing said second print job information to said printer system for processing a third input separator page to be used to identify a third print job.

* * * * *